US010852007B2

(12) United States Patent
Kawashima

(10) Patent No.: US 10,852,007 B2
(45) Date of Patent: Dec. 1, 2020

(54) HEAT PUMP DEVICE

(71) Applicant: Mitsubishi Electric Corporation, Tokyo (JP)

(72) Inventor: Mitsuru Kawashima, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/310,617

(22) PCT Filed: Aug. 25, 2016

(86) PCT No.: PCT/JP2016/074876
§ 371 (c)(1),
(2) Date: Dec. 17, 2018

(87) PCT Pub. No.: WO2018/037544
PCT Pub. Date: Mar. 1, 2018

(65) Prior Publication Data

US 2019/0331346 A1 Oct. 31, 2019

(51) Int. Cl.

| | |
|---|---|
| ***F24D 3/18*** | (2006.01) |
| ***F24F 3/06*** | (2006.01) |
| ***F24F 11/70*** | (2018.01) |
| ***F24F 1/16*** | (2011.01) |
| *F24F 1/18* | (2011.01) |

(52) U.S. Cl.
CPC .................. *F24D 3/18* (2013.01); *F24F 3/06* (2013.01); *F24F 1/16* (2013.01); *F24F 1/18* (2013.01); *F24F 11/70* (2018.01); *F25B 2341/0653* (2013.01)

(58) Field of Classification Search
CPC ............ F25B 49/005; F25B 2600/2525; F25B 2500/07; Y02B 30/12
See application file for complete search history.

(56) References Cited

U.S. PATENT DOCUMENTS

| | | | | |
|---|---|---|---|---|
| 2013/0205818 A1* | 8/2013 | Morimoto | F25B 25/005 | 62/186 |
| 2014/0196483 A1* | 7/2014 | Okazaki | F24F 11/70 | 62/79 |

FOREIGN PATENT DOCUMENTS

| | | |
|---|---|---|
| CN | 103797317 A | 5/2014 |
| JP | S50-133747 U | 11/1975 |
| JP | 2000-039246 A | 2/2000 |
| JP | 2000-104940 A | 4/2000 |
| JP | 2000-230732 A | 8/2000 |
| JP | 2001-208392 A | 8/2001 |

(Continued)

OTHER PUBLICATIONS

Office Action dated Nov. 5, 2019 issued in corresponding JP patent application No. 2018-536014 (and English translation).

(Continued)

*Primary Examiner* — Ana M Vazquez
(74) *Attorney, Agent, or Firm* — Posz Law Group, PLC

(57) ABSTRACT

A heat pump device can discharge air in a heat medium circuit regardless of the height positions of two bodies of the heat pump device and prevents refrigerant outflow when the refrigerant enters the heat medium circuit in the liquid heat exchanger. A pump causes the liquid heat medium to flow in a predetermined circulatory direction in a heat medium pipe, and a liquid heat exchanger, a first air vent valve and a second air vent valve are arranged in this order along a circulatory direction.

13 Claims, 4 Drawing Sheets

(56) References Cited

FOREIGN PATENT DOCUMENTS

| | | | | |
|---|---|---|---|---|
| JP | 2010-190466 A | | 9/2010 |
| JP | 2013-167395 A | | 8/2013 |
| JP | 2013-167398 A | | 8/2013 |
| JP | 2013167398 A | * | 8/2013 |
| JP | 2013-257079 A | | 12/2013 |
| JP | 5818900 B | | 11/2015 |
| JP | 2016-085029 A | | 5/2016 |
| JP | 2016-95130 A | | 5/2016 |

OTHER PUBLICATIONS

Extended European Search Report dated Sep. 17, 2019 issued in corresponding EP patent application No. 16914218.9.

International Search Report of the International Searching Authority dated Nov. 15, 2016 for the corresponding International application No. PCT/JP2016/074876 (and English translation).

Office Action dated May 7, 2020 issued in corresponding CN patent application No. 201680088527.1 (and English translation).

* cited by examiner

HEAT PUMP DEVICE

CROSS REFERENCE TO RELATED APPLICATION

This application is a U.S. national stage application of PCT/JP2016/074876 filed on Aug. 25, 2016, the contents of which are incorporated herein by reference.

TECHNICAL FIELD

The present invention relates to a heat pump device.

BACKGROUND ART

There has been known a heat pump device of the prior art including: a heat pump heat source unit that forms a refrigerant circuit by connecting, through piping, a compressor that compresses a refrigerant, an air heat exchanger that exchanges heat between air and the refrigerant, a water heat exchanger that exchanges heat between the refrigerant and water, and a throttle device that adjusts the pressure of the refrigerant flowing in the water heat exchanger; a water heater that includes a pump for causing the water having been subjected to heat exchange in the water heat exchanger to flow, forms a water circuit that supplies the heat-exchanged water together with the water heat exchanger, and includes an air vent valve for discharging the air in the water circuit; and a control device including an external contact terminal for inputting a signal indicating the operation permission of the heat pump heat source unit and the water heater, wherein a signal is input to the external contact terminal when the air vent valve is arranged outdoors (for example, see PTL 1).

CITATION LIST

Patent Literature

[PTL 1] Japanese Patent Application Publication No. 2013-167395

SUMMARY OF INVENTION

Technical Problem

As described above, in the heat pump device disclosed in PTL 1, when the air vent valve for discharging the air in the water circuit for supplying the water that has exchanged heat in the water heat exchanger is arranged outdoors, a signal indicating the operation permission is input to the control device and the operation of the heat pump heat source unit and the water heater becomes possible. The refrigerant circuit, the water heat exchanger, and a part of the water circuit are housed in a body (first body) of the heat pump heat source unit, and a part of the water circuit and the air vent valve are housed in a body (second body) of the water heater.

However, in the heat pump device as above, the air moves to a high place in the water circuit due to buoyancy, and hence the air in the water circuit cannot be discharged from the air vent valve in the second body unless the second body is arranged in a higher place than the first body. When the refrigerant in the refrigerant circuit enters the water circuit in the water heat exchanger due to damage and the like of the water heat exchanger, there is a fear that the refrigerant that has entered the water circuit flows out into the second body from the air vent valve, that is, there is a fear that the refrigerant flows out not only into the first body housing the damaged water heat exchanger but also into the second body not housing the water heat exchanger.

The present invention has been made in order to solve the problem as above, and obtains a heat pump device including two bodies, that is, a body housing a refrigerant circuit, a liquid heat exchanger, and a part of a liquid heat medium circuit, and a body housing a part of a liquid heat medium circuit and an air vent valve, the heat pump device being able to discharge air accumulated in the liquid heat medium circuit to the outside of the liquid heat medium circuit regardless of the height relationship between the installation positions of the two bodies, and prevent, even when a refrigerant in the refrigerant circuit enters the liquid heat medium circuit in the liquid heat exchanger due to the damage and the like of the liquid heat exchanger, the refrigerant that has entered the liquid heat medium circuit from flowing out into the body not housing the liquid heat exchanger.

Solution to Problem

A heat pump device according to the present invention includes: a compressor configured to compress refrigerant; a decompressor configured to decompress the refrigerant; an air heat exchanger configured to exchange heat between the refrigerant and air; a liquid heat exchanger configured to exchange heat between the refrigerant and liquid heat medium; a refrigerant pipe connecting the compressor, the decompressor, the air heat exchanger and the liquid heat exchanger circularly, the refrigerant pipe filled with the refrigerant; a pump configured to cause the liquid heat medium flowing in the liquid heat exchanger; a heat medium pipe connecting the liquid heat exchanger and the pump circularly, the heat medium pipe filled with the liquid heat medium; a first air vent valve and a second air vent valve which are able to discharge gas in the heat medium pipe outside; a first body housing the compressor, the decompressor, the air heat exchanger, the liquid heat exchanger, the refrigerant pipe and the first air vent valve, and a second body arranged outside of the first body, the second body housing the second air vent valve, the pump configured to cause the liquid heat medium flowing in predetermined circulatory direction in the heat medium pipe, the liquid heat exchanger, the first air vent valve and the second air vent valve arranged in this order along the circulatory direction.

Advantageous Effects of Invention

The heat pump device according to the present invention exhibits an effect in which the air accumulated in the liquid heat medium circuit can be discharged to the outside of the liquid heat medium circuit regardless of the height relationship between the installation positions of the two bodies, and, even when the refrigerant in the refrigerant circuit enters the liquid heat medium circuit in the water heat exchanger due to the damage and the like of the liquid heat exchanger, the refrigerant that has entered the liquid heat medium circuit can be prevented from flow out into the body not housing the liquid heat exchanger.

DESCRIPTION OF EMBODIMENTS

Embodiments of the present invention are described with reference to the accompanying drawings. The same or corresponding parts are denoted by the same reference symbols, and overlapping descriptions are simplified or omitted, as appropriate, throughout the drawings. The present invention is not limited to the following embodiments, and various modifications can be made without departing from the spirit of the present invention.

Embodiment 1

Figure 1:
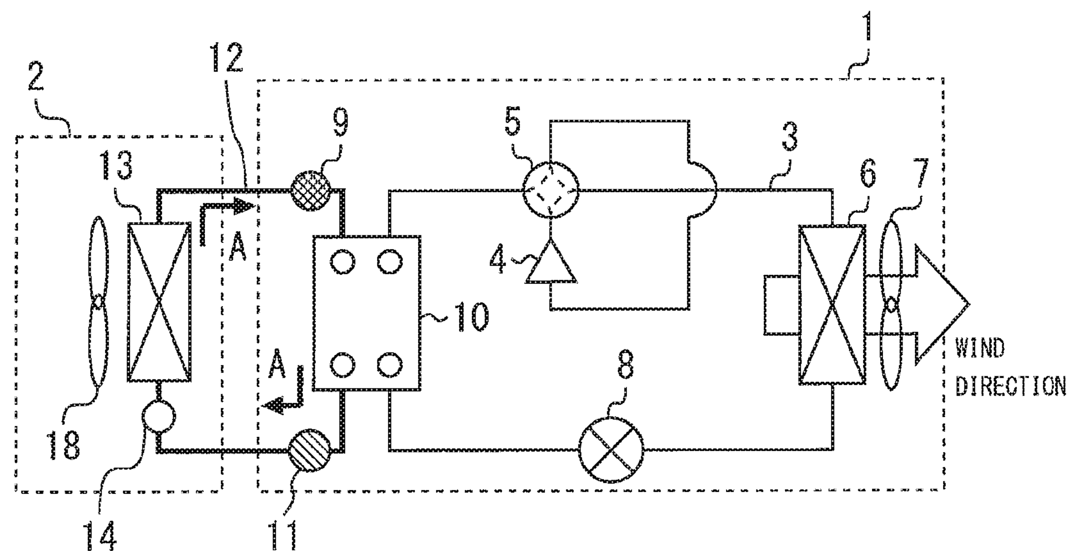
FIG. 1 is a view illustrating the internal configuration of an outdoor unit and an indoor unit of an air conditioning apparatus to which a heat pump device according to Embodiment 1 of the present invention is applied.
Figure 2:
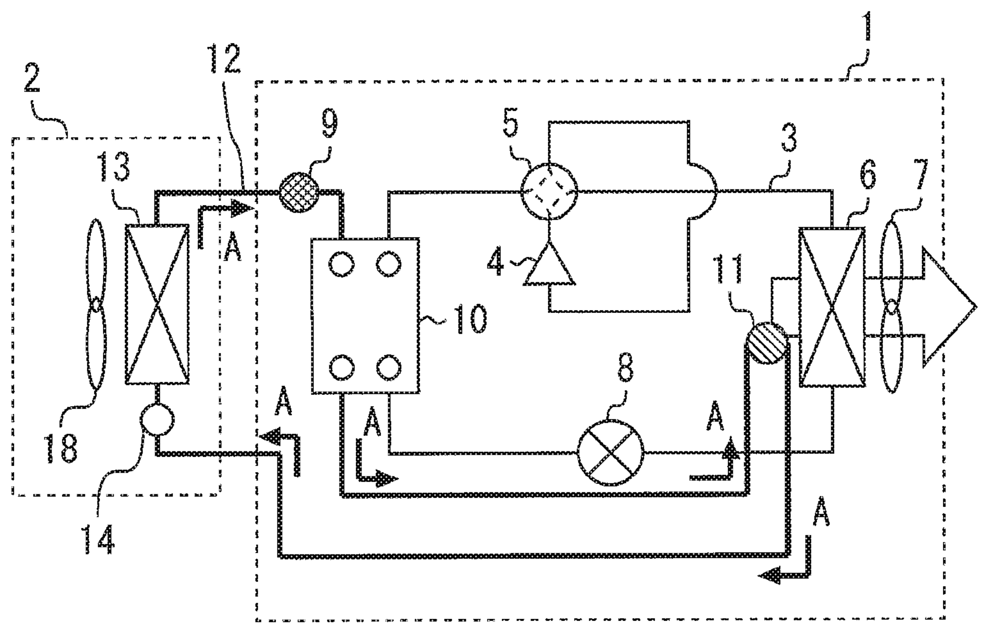
FIG. 2 is a view illustrating a modified example of the internal configuration of the outdoor unit and the indoor unit of the air conditioning apparatus to which the heat pump device according to Embodiment 1 of the present invention is applied.

FIG. 1 and FIG. 2 are views according to Embodiment 1 of the present invention. FIG. 1 is a view illustrating the internal configuration of an outdoor unit and an indoor unit of an air conditioning apparatus to which a heat pump device is applied, and FIG. 2 is a view illustrating a modified example of the internal configuration of the outdoor unit and the indoor unit of the air conditioning apparatus to which the heat pump device is applied.

A case where the heat pump device according to the present invention is applied to the air conditioning apparatus is described below as an example. The heat pump device according to the present invention can be a water heater, a display case, a refrigerator, and a chiller system, for example, besides the air conditioning apparatus.

The air conditioning apparatus includes an outdoor unit 1 and an indoor unit 2. The indoor unit 2 is installed in a room, the air of which is to be conditioned. The outdoor unit 1 is installed outside the room. The outdoor unit 1 includes a refrigerant pipe 3, a compressor 4, a four-way valve 5, an outdoor heat exchanger 6, an outdoor fan 7, an expansion valve 8, a pump 9, and a water heat exchanger 10. The indoor unit 2 includes an indoor heat exchanger 13 and an indoor fan 18.

A refrigerant is charged in the refrigerant pipe 3. As the refrigerant charged in the refrigerant pipe 3, a refrigerant having a small global warming potential (GWP) is desired to be used in terms of protection of the global environment. The refrigerant has a heavier average molecular weight than air (greater density than air), and has a property of sinking downward in the direction of gravity (vertical direction) in the air.

As a refrigerant as above, specifically, a (mixed) refrigerant including one or more refrigerants selected from tetrafluoropropene (CF3CF═CH2:HFO-1234yf), difluoromethane (CH2F2:R32), propane (R290), propylene (R1270), ethane (R170), butane (R600), isobutane (R600a), 1.3.3.3-tetrafluoro-1-propene (CF3-CH═CHF:HFO-1234ze), and the like can be used, for example. Those refrigerants include refrigerants flammable (slightly flammable or highly flammable) refrigerants.

The refrigerant pipe 3 circularly connects the compressor 4, the expansion valve 8, the outdoor heat exchanger 6, and the water heat exchanger 10. Therefore, a refrigerant circuit in which the refrigerant circulates between the outdoor heat exchanger 6 and the water heat exchanger 10 is formed. The compressor 4 is a device that enhances the pressure and the temperature of the supplied refrigerant by compressing the refrigerant. A rotary compressor or a scroll compressor can be used as the compressor 4, for example. The expansion valve 8 reduces the pressure of the refrigerant that is flowing into the expansion valve 8 by expanding the refrigerant. That is, the expansion valve 8 is a decompressor that decompresses the refrigerant.

The outdoor heat exchanger 6 is an air heat exchanger that exchanges heat between the refrigerant flowing into the outdoor heat exchanger 6 and the air. The outdoor fan 7 generates an air flow in an air passage in an outdoor unit body described below, and blows air so that the outside air passes through the outdoor heat exchanger 6. The outdoor heat exchanger 6 exchanges heat between the refrigerant flowing in the outdoor heat exchanger 6 and the outdoor air transmitted from the outdoor fan 7 by evaporating or condensing the refrigerant, and cools or heats the air.

The outdoor unit 1 and the indoor unit 2 are connected to each other by a water pipe 12. The water pipe 12 is circulatory provided between the water heat exchanger 10 of the outdoor unit 1 and the indoor heat exchanger 13 of the indoor unit 2. The water pipe 12 is charged with water serving as the liquid heat medium. That is, the water pipe 12 is a heat medium pipe filled with the water serving as the liquid heat medium. The water is an example of the liquid heat medium. As the liquid heat medium, brine and the like may be used besides water.

The water heat exchanger 10 is a liquid heat exchanger that exchanges heat between the refrigerant and the water serving as the liquid heat medium. As the water heat exchanger 10, a plate-type heat exchanger or a double-pipe heat exchanger having high heat exchange efficiency are used, for example.

The pump 9 is provided in the water pipe 12. The pump 9 is for causing the water serving as the liquid heat medium to flow though the water heat exchanger 10 serving as the liquid heat exchanger. The water pipe 12 serving as the heat medium pipe circularly connects the water heat exchanger 10 and the pump 9 to each other. Therefore, a water circuit in which the water circulates between the indoor heat exchanger 13 and the water heat exchanger 10 by the pump 9 is formed. The pump 9 causes the water (liquid heat medium) to flow in the water pipe (heat medium pipe) circularly formed as above in a predetermined circulatory direction. The circulatory direction is herein the direction indicated by arrow A in FIG. 1.

The indoor heat exchanger 13 exchanges heat, between the water flowing into the indoor heat exchanger 13 and the air. The indoor fan 18 generates an air flow in an air passage in an indoor unit body described below, and blows air so that the outside air passes through the indoor heat exchanger 13. The indoor heat exchanger 13 exchanges heat with the indoor air transmitted from the indoor fan 18 by exchanging heat between the high-temperature or low-temperature water flowing into the indoor heat exchanger 13 and the indoor air.

The outdoor unit 1 includes an outdoor unit body. The outdoor unit body serves as a first body. The refrigerant pipe 3, the compressor 4, the four-way valve 5, the outdoor heat exchanger 6, the outdoor fan 7, the expansion valve 8, the pump 9, the water heat exchanger 10, and a part of the water pipe 12 are housed in the outdoor unit body serving as the first body. The indoor unit 2 includes an indoor unit body. The indoor unit body serves as a second body. The indoor heat exchanger 13, the indoor fan 18, and a part, of the water pipe 12 are housed in the indoor unit body serving as the second body. The indoor unit body is provided separately from the outdoor unit body. In other words, the indoor unit body serving as the second body is provided outside the outdoor unit body serving as the first body.

An inlet port and an outlet port that cause the inside and the outside of the outdoor unit body to communicate with each other are formed in the outdoor unit body. An air passage that passes from the inlet port to the outlet port through the outdoor heat exchanger 6 and the outdoor fan 7 is formed in the outdoor unit body. That is, the air passage is for discharging the air, taken from the outside of the outdoor unit body, to the outside of the outdoor unit body after exchanging the heat of the air in the outdoor heat exchanger 6. An inlet port, an outlet port, and an air passage are similarly formed also for the indoor unit body.

The air conditioning apparatus to which the heat pump device according to Embodiment 1 of the present invention is applied further includes an outdoor-side air vent valve 11 and an indoor-side air vent valve 14. The outdoor-side air vent valve 11 and the indoor-side air vent valve 14 are valves capable of discharging gas such as the air in the water pipe 12 serving as the heat medium pipe to the outside. The outdoor-side air vent valve 11 and the indoor-side air vent valve 14 are pressure regulating valves, for example. The pressure regulating valve is a self-control valve capable of keeping the internal pressure of the water pipe 12 constant by opening the water pipe 12 when the internal pressure of the water pipe 12 becomes equal to or more than a preset value.

When there is air in the water pipe 12 and the like of the water circuit, smooth distribution of the water is inhibited. When the air enters the pump 9, there is a fear of idling (so-called “air entrainment”), thereby preventing the water to circulate. For example, the inside of the air vent valve is normally filled with water, and is sealed by an opening portion and a float coming into close contact with each other. When air is accumulated in the air vent valve, the float comes down to the water surface position while floating in the water. As a result, a gap is formed between the opening portion and the float, and only the air is discharged to the outside.

The outdoor-side air vent valve 11 serves as a first air vent valve. The indoor-side air vent valve 14 serves as a second air vent valve. The outdoor-side air vent valve 11 and the indoor-side air vent valve 14 are both provided in the water pipe 12 serving as the heat medium pipe. The outdoor-side air vent valve 11 is provided in a part of the water pipe 12 that is housed in the outdoor unit body. In other words, the outdoor-side air vent valve 11 serving as the first air vent valve is housed in the outdoor unit body serving as the first body.

The indoor-side air vent valve 14 is provided in a part of the water pipe 12 that is housed in the indoor unit body. In other words, the indoor-side air vent valve 14 serving as the second air vent valve is housed in the indoor unit body serving as the second body.

The water heat exchanger 10, the outdoor-side air vent valve 11 and the indoor-side air vent valve 14 are arranged in the order of the water heat exchanger 10, the outdoor-side air vent valve 11, and the indoor-side air vent valve 14 along a circulatory direction A of the water in the water circuit described above. Therefore, when the pump 9 operates, the water in the water circuit flows so as to pass through the water heat exchanger 10, the outdoor-side air vent valve 11, and the indoor-side side air vent valve 14 in this order.

The refrigerant circuit and the water circuit formed as above function as a heat pump that transfers heat between the indoor unit 2 and the outdoor unit 1 by exchanging heat between the refrigerant and the air in the outdoor heat exchanger 6, exchanging heat between the refrigerant and the water in the water heat exchanger 10, and exchanging heat between the water and the air in the indoor heat exchanger 13. That is, an indirect heat pump device using a primary circuit (refrigerant circuit) in which a flammable refrigerant circulates and a secondary circuit in which a nonflammable heat medium (water herein) circulates is obtained. At this time, by switching the four-way valve 5, the circulatory direction of the refrigerant in the refrigerant circuit can be reversed, and the operation can be switched between the cooling operation and the heating operation.

First, during the cooling operation, in the refrigerant circuit on the primary side, the refrigerant becomes a high-temperature and high-pressure refrigerant by the compressor 4 and flows into the outdoor heat exchanger 6 through the four-way valve 5. At this time, the outdoor heat exchanger 6 functions as a condenser, and condenses the refrigerant flowing into the outdoor heat exchanger 6. That is, the high-temperature refrigerant flowing into the outdoor heat exchanger 6 condenses by exchanging heat with the low-temperature outside air, and becomes a liquid refrigerant.

The liquid refrigerant expands through the expansion valve 8, and becomes a refrigerant in a gas-liquid two-phase state in which a gas phase and a liquid phase are mixed at low temperature and low pressure. The low-temperature gas-liquid two-phase refrigerant flows into the water heat exchanger 10, exchanges heat with the water circulating in the water circuit, evaporates, and becomes a gas refrigerant. The water in the water circuit is cooled through the heat exchange. That is, the water heat exchanger 10 functions as a heat absorber that absorbs heat from the water in the water circuit, and cools the water. The gas refrigerant flows into the compressor 4 again through the four-way valve 5, and becomes a high-temperature high-pressure refrigerant.

In the water circuit, the water is circulated by the pressure generated by the pump. The water that has become low-temperature water by being cooled by the water heat exchanger 10 flows into the water pipe 12 in the indoor unit body from the water pipe 12 in the outdoor unit body through the outdoor-side air vent valve 11 while maintaining the low temperature thereof. The low-temperature water flowing in the water pipe 12 in the indoor unit body flows into the indoor heat exchanger 13 through the indoor-side air vent valve 14.

The water flowing into the indoor heat exchanger 13 is heated by exchanging heat with the indoor air. At this time, the indoor air is cooled. The heated water proceeds to the water pipe 12 in the outdoor unit body, flows into the water heat exchanger 10 again through the pump 9, and is cooled, thereby becoming low-temperature water.

Next, in the heating operation, in the refrigerant circuit on the primary side, the refrigerant becomes a high-temperature and high-pressure refrigerant by the compressor 4 and flows into the water heat exchanger 10 through the four-way valve 5. The refrigerant flowing into the water heat exchanger 10 condenses by exchanging heat with the water circulating in the water circuit, and becomes a liquid refrigerant. At this time, the water circulating in the water circuit is heated. That is, the water heat exchanger 10 functions as a radiator, and heats the water flowing in the water circuit.

The liquid refrigerant expands through the expansion valve 8 and becomes a low-temperature and low-pressure gas-liquid two-phase refrigerant. The gas-liquid two-phase refrigerant flows into the outdoor heat exchanger 6. At this time, the outdoor heat exchanger 6 functions as an evaporator, and evaporates the refrigerant flowing into the outdoor heat exchanger 6. That is, the gas-liquid two-phase refrigerant flowing into the outdoor heat exchanger 6 evaporates by exchanging heat with the outside air, and becomes a gas refrigerant. The gas refrigerant flows into the compressor 4 again through the four-way valve 5 and becomes a high-temperature and high-pressure refrigerant.

In the water circuit, the water in the water circuit is circulated by the pressure generated by the pump 9. First, low-temperature water cooled in the water heat exchanger 10 flows to the water pipe 12 in the indoor unit body from the water pipe 12 in the outdoor unit body through the outdoor-side air vent valve 11 while maintaining the high temperature thereof. The high-temperature water flowing in the water pipe 12 in the indoor unit body flows into the indoor heat exchanger 13 through the indoor-side air vent valve 14.

The water flowing into the indoor heat exchanger 13 is cooled by exchanging heat with the indoor air. At this time, the indoor air is heated. The cooled water proceeds to the water pipe 12 in the outdoor unit body, flows into the water heat exchanger 10 again through the pump 9, and is heated, thereby becoming high-temperature water.

The low-temperature refrigerant flows into the water heat exchanger 10 in the cooling operation and the like. At this time, a refrigerant that is 0 degrees Celsius (the freezing point of the water) or below may flow into the water heat exchanger 10. In that case, there is a fear that the water circulating in the water circuit freezes, and the water heat exchanger 10 becomes damaged due to the expansion of the volume of the water by the freezing. In addition, for example, the water heat exchanger 10 may be damaged due to degradation over time, external stress, and the like.

When the water heat exchanger 10 is damaged, the flow path of the refrigerant and the flow path of the water in the water heat exchanger 10 may communicate with each other. In that case, the internal pressure of the refrigerant pipe 3 is higher than the internal pressure of the water pipe 12, and hence there is a fear that the refrigerant in the refrigerant pipe 3 of the refrigerant circuit enters the water pipe 12 of the water circuit.

The refrigerant flowing into the water heat exchanger in the heating operation is a high-temperature and high-pressure gas refrigerant compressed by the compressor 4. Therefore, when the flow path of the refrigerant and the flow path of the water in the water heat exchanger 10 communicate with each other due to damage of the water heat exchanger 10 in the heating operation, the refrigerant in the gas state enters the water pipe 12 of the water circuit and the refrigerant that has entered the water pipe 12 flows in the water circuit while remaining as gas.

The refrigerant flowing into the water heat exchanger 10 in the cooling operation is a low-temperature gas-liquid two-phase refrigerant. Therefore, when the flow path of the refrigerant and the flow path of the water in the water heat exchanger 10 communicate with each other due to damage of the water heat exchanger 10 in the cooling operation, the refrigerant in the gas-liquid two-phase state enters the water pipe 12 of the water circuit. Out of the refrigerant, the refrigerant in the liquid phase evaporates by being heated by the water when entering the water pipe 12. Meanwhile, the refrigerant in the gas phase remains to be gas. Therefore, the refrigerant that has entered the water pipe 12 flows in the water circuit in the gas state also in the cooling operation. That is, the refrigerant that has entered the water pipe 12 flows in the water circuit in the gas state in both of the heating operation and the cooling operation.

The gas refrigerant that has entered the water circuit in the water heat exchanger 10 flows toward the indoor unit 2 from the outdoor unit 1 along the circulatory direction A described above by the pressure generated by the pump 9. As described above, the water heat exchanger 10, the outdoor-side air vent valve 11, and the indoor-side air vent valve 14 are arranged along the circulatory direction A in the order of the water heat exchanger 10, the outdoor-side air vent valve 11, and the indoor-side air vent valve 14. Therefore, the gas refrigerant that has entered the water circuit in the water heat exchanger 10 reaches the outdoor-side air vent valve 11 first before reaching the indoor-side air vent valve 14.

The refrigerant that has reached the outdoor-side air vent valve 11 is gas, and hence the refrigerant is discharged to the outside of the water pipe 12 due to the operation of the outdoor-side air vent valve 11 described above. The outdoor-side air vent valve 11 is housed in the body of the outdoor unit 1 serving as the first body as described above. Therefore, the refrigerant discharged from the outdoor-side air vent valve 11 is first transferred into the body of the outdoor unit 1, and is eventually discharged to a place in which the body of the outdoor unit 1 is installed, that is, the outdoor space herein.

As described above, the gas refrigerant that has entered the water circuit in the water heat exchanger 10 is discharged by the outdoor-side air vent valve 11, and hence the refrigerant does not reach the indoor-side air vent valve 14, and only the water flows to the indoor-side air vent valve 14. Therefore, even when the gas refrigerant enters the water circuit in the water heat exchanger 10, the refrigerant is not discharged from the indoor-side air vent valve 14. The indoor-side air vent valve 14 is housed in the body of the indoor unit 2 serving as the second body as described above. Therefore, the refrigerant not being discharged from the indoor-side air vent valve 14 means that the refrigerant is not discharged into the body of the indoor unit 2, and the refrigerant can be prevented from being discharged to the indoor space when the indoor unit 2 is installed.

As described above, in the heat pump device according to Embodiment 1 of the present invention, the water pipe 12 of the secondary circuit is circulatory provided between the body of the outdoor unit 1 that is the first body housing the refrigerant pipe 3 and the water heat exchanger 10 of the primary circuit and the body of the indoor unit 2 serving as the second body. When the body of the outdoor unit 1 is at a relatively higher position than the body of the indoor unit 2, the air accumulated in the water pipe 12 is gathered to the side of the body of the outdoor unit 1 in the water pipe 12 due to buoyancy, and is discharged to the outside from the outdoor-side air vent valve 11 housed in the body of the outdoor unit 1.

On the other hand, when the body of the outdoor unit 1 is at relatively higher position than the body of the indoor unit 2, the air accumulated in the water pipe 12 is gathered to the side of the body of the indoor unit 2 in the water pipe 12 due to buoyancy, and is discharged to the outside from the indoor-side air vent valve 14 housed in the body of the indoor unit 2. Therefore, the air accumulated in the water pipe 12 can be discharged to the outside of the water pipe 12 regardless of the height relationship between the installation positions of the bodies, that is, the outdoor unit 1 (first body) and the indoor unit 2 (second body).

Even when the refrigerant in the refrigerant pipe 3 enters the water pipe 12 in the water heat exchanger 10, the refrigerant can be discharged from the outdoor-side air vent valve 11 before the refrigerant flows to the indoor unit 2, and the refrigerant that has entered the water pipe 12 can be prevented from being discharged into the body of the indoor unit 2 from the indoor-side air vent valve 14 as described above.

When the refrigerant enters the water circuit in the water heat exchanger 10, the internal pressure of the water pipe of the water circuit rises overall. Therefore, when the outdoor-side air vent valve 11 is a pressure regulating valve, the internal pressure of the water pipe 12 rises due to the refrigerant entering the water circuit. When the internal pressure of the water pipe 12 becomes equal to or more than a preset working pressure, the outdoor-side air vent valve 11 operates and opens the water pipe 12. As a result, the refrigerant in the water pipe 12 is discharged to the outside. In that case, the working pressure of the outdoor-side air vent valve 11 is adjusted so that the outdoor-side air vent valve 11 operates before the gas refrigerant that has entered the water circuit reaches the indoor-side air vent valve 14.

When the pump 9 is connected between the water heat exchanger 10 and the outdoor-side air vent valve 11, there is a fear that the gas refrigerant that has entered the water circuit in the water heat exchanger 10 flows into the pump 9 and the idling (air entrainment) of the pump 9 is caused, thereby preventing a water flow along the circulatory direction A from being generated in the water circuit. When the pump 9 cannot generate a water flow along the circulatory direction A, there is a fear that the refrigerant that has entered the water circuit flows in a direction opposite to the circulatory direction A due to buoyancy and the like. When the refrigerant that has entered the water circuit flows in a direction opposite to the circulatory direction A, the refrigerant reaches the indoor-side air vent valve 14 before reaching the outdoor-side air vent valve 11, and the refrigerant is discharged into the body of the indoor unit 2 from the indoor-side air vent valve 14.

Thus, in order to prevent the situation as above from occurring, it is preferred that the pump 9 be connected to a place other than the place between the water heat exchanger 10 and the outdoor-side air vent valve 11 in the water circuit. For example, it is preferred that the pump 9 be connected to a place on the upstream of the water heat exchanger 10 along the circulatory direction A as illustrated in FIG. 1. That is, it is preferred that the pump 9, the water heat exchanger 10, the outdoor-side air vent valve 11, and the indoor-side air vent valve 14 be arranged in this order along the circulatory direction A.

By the configuration as above, when the pump 9 operates, the water in the water circuit flows so as to pass through the water heat exchanger 10, the outdoor-side air vent valve 11, and the indoor-side air vent valve 14 in this order. Therefore, when the gas refrigerant enters the water circuit in the water heat exchanger 10 during the operation of the pump 9, the gas refrigerant does not flow to the pump 9 but flows to the outdoor-side air vent valve 11 from the water heat exchanger 10 along the circulatory direction A. Therefore, the gas refrigerant reaches the outdoor-side air vent valve 11 before reaching the pump 9, and is discharged to the outside of the water circuit from the outdoor-side air vent valve 11. As a result, a case where a backward flow of the refrigerant is generated due to the idling of the pump 9 caused by the refrigerant that has entered the water circuit can be prevented, and the gas refrigerant can be discharged from the outdoor-side air vent valve 11 before reaching the indoor unit 2 more reliably.

Next, a modified example of the air conditioning apparatus to which the heat pump device according to Embodiment 1 is applied is described with reference to FIG. 2. In the example illustrated in FIG. 2, the outdoor-side air vent valve 11 serving as the first air vent valve is arranged in an air passage in the outdoor unit body. The outdoor-side air vent valve 11 is particularly arranged on the windward of the outdoor heat exchanger 6 in the air passage. By the configuration as above, the refrigerant discharged into the body of the outdoor unit 1 from the outdoor-side air vent valve 11 can be effectively agitated by blowing air by the outdoor fan 7, and the generation of an area in which the concentration of the refrigerant is high in the outdoor space can be suppressed.

At this time, it is preferred that the outdoor-side air vent valve 11 be particularly arranged on the windward of the outdoor heat exchanger 6 in the air passage. For example, in the cooling operation, the outdoor heat exchanger 6 becomes relatively high in temperature, and the inside of the water pipe 12 becomes relatively low in temperature. When the outdoor-side air vent valve 11 is arranged in the air passage, the water pipe 12 at the place where the outdoor-side air vent valve 11 is provided is also arranged in the air passage. Therefore, when the outdoor-side air vent valve 11 is arranged on the leeward of the outdoor heat exchanger 6 in the air passage, the water pipe 12 at the place where the outdoor-side air vent valve 11 is provided is heated by warm air in the air passage that has passed through the outdoor heat exchanger 6, and the temperature of the water in the water pipe 12 rises. As a result, the efficiency is degraded. Therefore, as described above, it is preferred that the outdoor-side air vent valve 11 be arranged on the windward of the outdoor heat exchanger 6 in the air passage.

Embodiment 2

Figure 3:
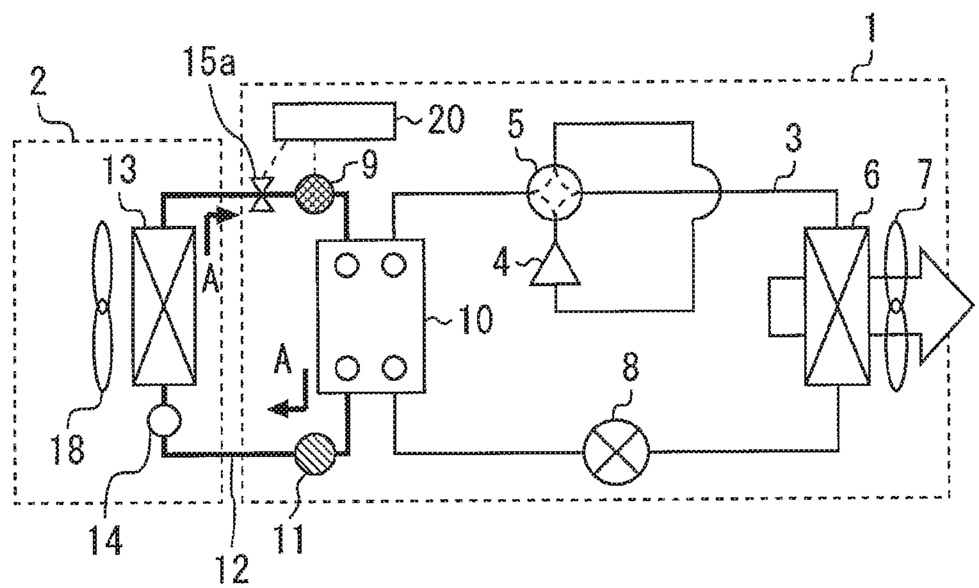
FIG. 3 illustrates the internal configuration of an outdoor unit and an indoor unit of an air conditioning apparatus to which a heat pump device according to Embodiment 2 of the present invention is applied.
Figure 4:
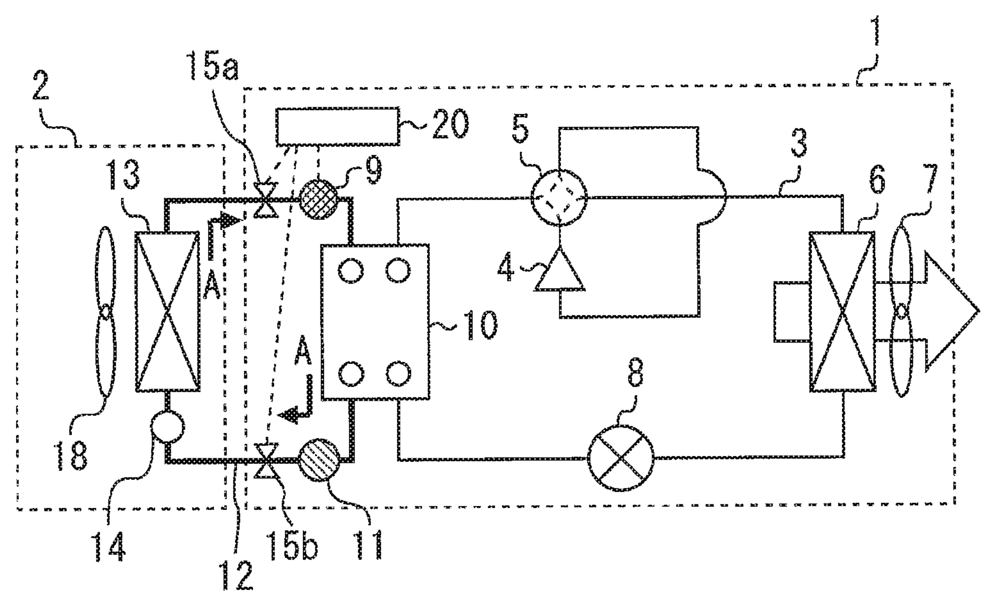
FIG. 4 is a view illustrating a modified example of the internal configuration of the outdoor unit and the indoor unit of the air conditioning apparatus to which the heat pump device according to Embodiment 2 of the present invention is applied.

FIG. 3 and FIG. 4 are views according to Embodiment 2 of the present invention. FIG. 3 illustrates the internal configuration of an outdoor unit and an indoor unit of an air conditioning apparatus to which a heat pump device is applied, and FIG. 4 is a view illustrating a modified example of the internal configuration of the outdoor unit and the indoor unit of the air conditioning apparatus to which the heat pump device is applied.

In Embodiment 2 described here, a shut-off valve is provided in the heat medium circuit (water circuit) in addition to the configuration of Embodiment 1 described above. Differences from Embodiment 1 are mainly described below for the heat pump device according to Embodiment 2.

As illustrated in FIG. 3, Embodiment 2 includes a first shut-off valve 15*a*. The first shut-off valve 15*a* is a valve capable of closing the water pipe 12 serving as the heat medium pipe. The first shut-off valve 15*a*, the water heat exchanger 10, the outdoor-side air vent valve 11, and the indoor-side air vent valve 14 are arranged along the circulatory direction A in the order of the first shut-off valve 15*a*, the water heat exchanger 10, the outdoor-side air vent valve 11, and the indoor-side air vent valve 14. For example, the first shut-off valve 15*a* is provided in the water pipe 12 between the indoor heat exchanger 13 and the pump 9 in the water circuit.

The operation of the first shut-off valve 15*a*, that is, the closing and the opening of the valve is controlled by a control device 20, for example. A signal relating to the operation state of the pump 9 is input to the control device 20. That is, when the pump 9 starts to operate, the pump operation signal is input to the control device 20. When the pump 9 stops the operation, a pump stopping signal is input to the control device 20.

When the pump operation signal is input to the control device 20, the control device 20 opens the first shut-off valve 15*a*. When the pump stopping signal is input to the control device 20, the control device 20 closes the first shut-off valve 15*a*. Therefore, the first shut-off valve 15*a* closes the water pipe 12 serving as the heat medium pipe when the pump 9 stops.

The control device 20 includes an electric circuit for realizing the functions as above. As the electric circuit as above, an electric circuit including a microcomputer including a processor and a memory may be used, for example. In that case, the control device 20 realizes the functions described above by executing preset processing by executing a program stored in the memory by the processor.

Other configurations are similar to that of Embodiment 1, and detailed descriptions thereof are omitted.

In the heat pump device formed as above, when the operation of the pump 9 stops when the operation of the heat pump device stops, for example, the first shut-off valve 15*a* closes the water pipe 12. In this state, the outdoor-side air vent valve 11 is connected to the water pipe 12 on one side (the side of the circulatory direction A) when seen from the water heat exchanger 10. The water pipe 12 on the other side (the side opposite to the circulatory direction A) when seen from the water heat exchanger 10 is closed by the first shut-off valve 15*a*.

Therefore, when the refrigerant enters the water pipe 12 of the water circuit in the water heat exchanger 10 due to damage of the water heat exchanger 10 when the pump 9 is stopped, the refrigerant reaches the outdoor-side air vent valve 11 before reaching the indoor-side air vent valve 14 and is discharged from the outdoor-side air vent valve 11 if the refrigerant transfers in the circulatory direction A in the water pipe 12.

Even when the refrigerant transfers in the water pipe 12 in a direction opposite to the circulatory direction A because there is no water flow by the pump 9, the first shut-off valve 15*a* blocks the transfer of the refrigerant. When the refrigerant further continues to enter the water circuit, the refrigerant starts to accumulate in the water pipe 12 between the first shut-off valve 15*a* and the place in the water circuit where the refrigerant enters. In the area in which the refrigerant is accumulated in the water circuit, one end is at the position of the first shut-off valve 15*a*, and the other end gradually transfers in the same direction as the circulatory direction A as the amount of the refrigerant increases. When the other end of the area in which the refrigerant is accumulated reaches the outdoor-side air vent valve 11, the refrigerant is discharged to the outside from the outdoor-side air vent valve 11.

As described above, by closing the water pipe 12 by the first shut-off valve 15*a* arranged on the side opposite to the circulatory direction A when seen from the water heat exchanger 10 when the pump 9 is stopped, the following is obtained. That is, even when the refrigerant enters the water pipe 12 in the water heat exchanger 10 when the pump 9 is stopped, the refrigerant can be prevented from being discharged into the body of the indoor unit 2 from the indoor-side air vent valve 14 and the refrigerant can be discharged from the outdoor-side air vent valve 11 more reliably.

Next, a modified example of the air conditioning apparatus to which the heat pump device according to Embodiment 2 is applied is described with reference to FIG. 4. The example illustrated in FIG. 4 includes a second shut-off valve 15*b* in addition to the first shut-off valve 15*a*. The second shut-off valve 15*b* is also a valve capable of closing the water pipe 12 serving as the heat medium pipe as with the first shut-off valve 15*a*. The first shut-off valve 15*a*, the water heat exchanger 10, the outdoor-side air vent valve 11, the second shut-off valve 15*b*, and the indoor-side air vent valve 14 are arranged along the circulatory direction A in the order of the first shut-off valve 15*a*, the water heat exchanger 10, the outdoor-side air vent valve 11, the second shut-off valve 15*b*, and the indoor-side air vent valve 14. For example, the second shut-off valve 15*b* is herein provided in the water pipe 12 between the outdoor-side air vent valve 11 and the indoor-side air vent valve 14 in the water circuit.

When the pump operation signal is input to the control device 20, the control device 20 closes the first shut-off valve 15*a* and the second shut-off valve 15*b*. When the pump stopping signal is input to the control device 20, the control device 20 closes the first shut-off valve 15*a* and the second shut-off valve 15*b*. Therefore, the first shut-off valve 15*a* and the second shut-off valve 15*b* close the water pipe 12 serving as the heat medium pipe when the pump 9 is stopped.

In the heat pump device formed as above, when the operation of the pump 9 stops when the operation of the heat pump device stops, for example, the first shut-off valve 15*a* and the second shut-off valve 15*b* close the water pipe 12. In this state, the side on which the pump 9, the water heat exchanger 10, and the outdoor-side air vent valve 11 are arranged, and the side on which the indoor heat exchanger 13 and the indoor-side air vent valve 14 are arranged in the water circuit are completely separated from each other by the first shut-off valve 15*a* and the second shut-off valve 15*b*.

Therefore, the refrigerant that has entered the water pipe 12 of the water circuit in the water heat exchanger 10 when the pump 9 is stopped does not flow to the side on which the indoor heat exchanger 13 and the indoor-side air vent valve 14 are arranged. As a result, the refrigerant can be prevented from being discharged into the body of the indoor unit 2 from the indoor-side air vent valve 14 and the refrigerant can be discharged from the outdoor-side air vent valve 11 more reliably.

At this time, when the first shut-off valve 15*a* and the second shut-off valve 15*b* are arranged in the body of the outdoor unit 1, the part of the water circuit housed in the body of the indoor unit 2 can be separated when those shut-off valves are closed. Therefore, the refrigerant that has entered the water pipe 12 of the water circuit in the water heat exchanger 10 not only can be prevented from reaching the indoor-side air vent valve 14, but the refrigerant can also be prevented from entering the water pipe 12 housed in the body of the indoor unit 2.

The conditions for closing the first shut-off valve 15*a* and the like may be conditions other stopping the pump 9. For example, for example, a flow rate sensor may be arranged in the water pipe 12 and the like in the water circuit, and the first shut-off valve 15*a* and the like may be closed when the flow rate of the water decreases to be equal to or less than a preset reference value. In that case, specifically, the flow rate of the water in the steady state by the operation of the pump 9 is set to 0.5 m/s, and the reference value for closing the first shut-off valve 15*a* is set to 0.1 m/s, for example. When the device is operating, the pump 9 operates, and hence the water circulates at 0.5 m/s. Meanwhile, when the device is stopped, the pump 9 stops. At this time, there is a residual water flow, and hence the flow rate gradually decreases. The flow rate decreases to 0.1 m/s after a certain period of time elapses from when the device is stopped. Then, the flow rate sensor transmits a signal indicating that the flow rate has become equal to or less than the reference value to the control device 20. The control device 20 that has received the signal closes the first shut-off valve 15*a*.

As described above, by closing the first shut-off valve 15*a* on the basis of the flow rate of the water in the water circuit, the hydraulic pressure applied to the first shut-off valve 15*a* by the water flow remaining after the pump 9 is stopped can be reduced as compared to when the first shut-off valve 15*a* is closed immediately after the pump 9 is stopped, and hence the degradation of the first shut-off valve 15*a* can be prevented.

Alternatively, the first shut-off valve 15*a* may operate in accordance with the operation of the entire heat pump device, and the first shut-off valve 15*a* may be closed when the operation of the heat pump device is stopped.

Embodiment 3

Figure 5:
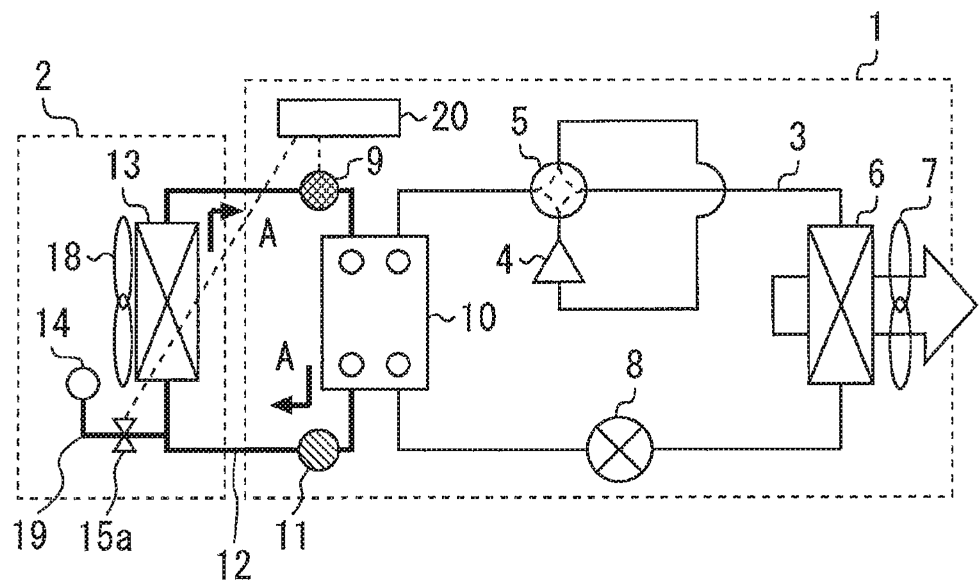
FIG. 5 illustrates the internal configuration of an outdoor unit and an indoor unit of an air conditioning apparatus to which a heat pump device according to Embodiment 3 of the present invention is applied.

FIG. 5 is a view according to Embodiment 3 of the present invention that illustrates the internal configuration of an outdoor unit and an indoor unit of an air conditioning apparatus to which a heat pump device is applied.

Embodiment 3 describe here is obtained by causing the heat medium pipe (water pipe) of the heat medium circuit (water circuit) to branch off in the second body (indoor unit body), and providing the second air vent valve (indoor-side air vent valve) and the shut-off valve in the pipe that has branched off in the configuration of Embodiment 2 described above. Differences from Embodiment 2 are mainly described below for the heat pump device according to Embodiment 3.

As illustrated in FIG. 5, the water pipe 12 includes a branch pipe 19. The branch pipe 19 is connected co a position after the outdoor-side air vent valve 11 and the indoor heat exchanger 13 in the water pipe 12. That is, the branch point at which the branch pipe 19 is connected to the water pipe 12 corresponds to the position at which the indoor-side air vent valve 14 is provided in Embodiment 1 and Embodiment 2.

The branch pipe 19 is housed in the body of the indoor unit 2 serving as the second body. The branch pipe 19 is provided so as to extend vertically upward from the branch point when the indoor unit 2 is properly installed. The indoor-side air vent valve 14 is provided on an uppermost end portion of the branch pipe 19. The first shut-off valve 15*a* is provided between the branch point and an uppermost end of the branch pipe 19, that is, in the middle of the branch pipe 19.

Other configurations are similar to that of Embodiment 2. That is, the first shut-off valve 15*a* closes the water pipe 12 serving as the heat medium pipe when the pump 9 is stopped. The first shut-off valve 15*a* herein closes the branch pipe 19 in which the first shut-off valve 15*a* is provided in the water pipe 12. Therefore, the control device 20 similar to that in Embodiment 2 is included. Detailed descriptions of other configurations are omitted.

In the heat pump device formed as above, when the operation of the pump 9 stops when the operation of the heat pump device stops, for example, the first shut-off valve 15*a* closes the branch pipe 19 of the water pipe 12. In this state, the indoor-side air vent valve 14 is separated from the water circuit. Therefore, when the refrigerant enters the water pipe 12 of the water circuit in the water heat exchanger 10 due to damage of the water heat exchanger 10 when the pump 9 is stopped, the refrigerant that has entered the water pipe 12 can be reliably prevented from reaching the indoor-side air vent valve 14. Therefore, the refrigerant can be prevented from being discharged into the body of the indoor unit 2 from the indoor-side air vent valve 14, and the refrigerant can be discharged from the outdoor-side air vent valve 11 more reliably.

The branch pipe 19 is provided so as to extend vertically upward from the branch point of the water pipe 12, and the indoor-side air vent valve 14 is provided on the uppermost end portion of the branch pipe 19. Therefore, the air that is accumulated in the water pipe 12 in normal operation is gathered in the uppermost end portion of the branch pipe 19 due to buoyancy, and the air can be discharged to the outside from the indoor-side air vent valve 14.

A branch pipe different from the branch pipe 19 may be provided also in the body of the outdoor unit 1, and the outdoor-side air vent valve 11 may be provided on an uppermost portion of the branch pipe different from the branch pipe 19. By the configuration as above, the air or the gas refrigerant in the water pipe 12 can be easily guided to the outdoor-side air vent valve 11.

Embodiment 4

Figure 6:
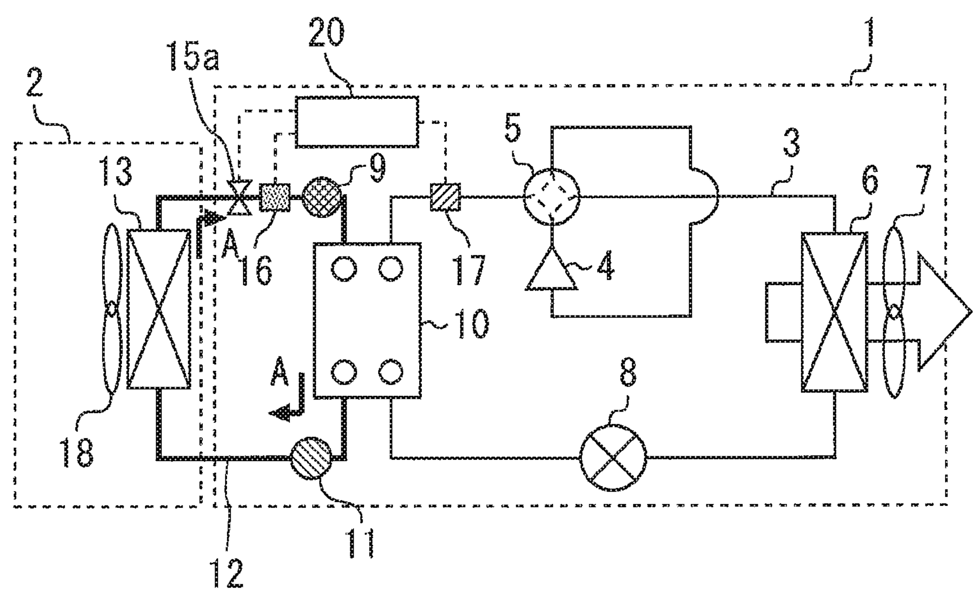
FIG. 6 is a view illustrating the internal configuration of an outdoor unit and an indoor unit of an air conditioning apparatus to which a heat pump device according to Embodiment 4 of the present invention is applied.
Figure 7:
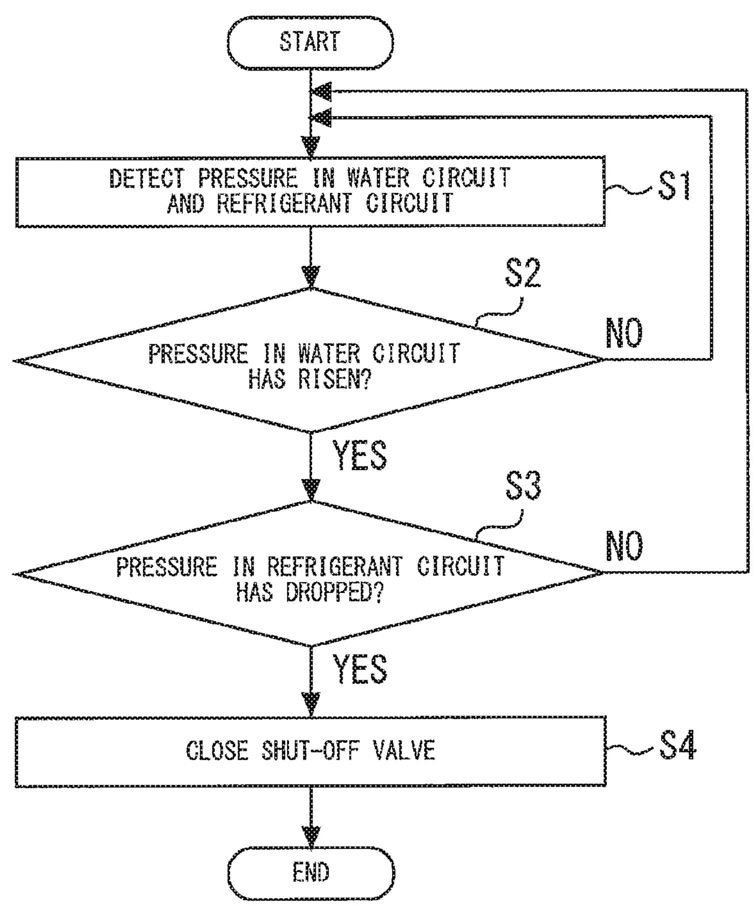
FIG. 7 is a flowchart illustrating the operation of the heat pump device according to Embodiment 4 of the present invention.

FIG. 6 and FIG. 7 are a view and a diagram according to Embodiment 2 of the present invention. FIG. 6 is a view illustrating the internal configuration of an outdoor unit and an indoor unit of an air conditioning apparatus to which a heat pump device is applied, and FIG. 7 is a flowchart illustrating the operation of the heat pump device.

Embodiment 4 described here is obtained by causing the shut-off valve provided in the heat medium pipe (water pipe) of the heat medium circuit (water circuit) to close in accordance with the internal pressure of the heat medium pipe (water pipe) and the internal pressure of the refrigerant pipe of the refrigerant circuit in the configuration of Embodiment 2 described above. Differences from Embodiment 2 are mainly described below for the heat pump device according to Embodiment 4.

FIG. 6 illustrates a configuration in which a water pressure sensor 16 and a refrigerant pressure sensor 17 are included in the configuration illustrated in FIG. 3 of Embodiment 2. The water pressure sensor 16 detects the internal pressure of the water pipe 12. That is, the water pressure sensor 16 is a heat medium pressure sensor that detects the internal pressure of the water pipe 12 serving as the heat medium pipe. The refrigerant pressure sensor 17 detects the internal pressure of the refrigerant pipe 3. The detection results of the water pressure sensor 16 and the refrigerant pressure sensor 17 are transmitted to the control device 20.

The refrigerant pressure sensor 17 is provided in at least one of the refrigerant pipe 3 between the water heat exchanger 10 and the four-way valve 5, and the refrigerant pipe between the water heat exchanger 10 and the outdoor heat exchanger 6. FIG. 6 illustrates a case where the refrigerant pressure sensor 17 is provided in the refrigerant pipe 3 between the water heat exchanger 10 and the four-way valve 5 as an example.

The control device 20, when the internal pressure of the refrigerant pipe 3 detected by the refrigerant pressure sensor 17 is equal to or less than a refrigerant pressure reference value and when the internal pressure of the water pipe 12 detected by the water pressure sensor 16 is equal to or more than a water pressure reference value (heat medium pressure reference value), the control device 20 closes the first shut-off valve 15*a*. The refrigerant pressure reference value and the water pressure reference value (heat medium pressure reference value) are preset. That is, when the internal pressure of the refrigerant pipe 3 is equal to or less than the preset refrigerant pressure reference value and the internal pressure of the water pipe 12 serving as the heat medium pipe is equal to or more than the preset heat medium pressure reference value (water pressure reference value), the first shut-off valve 15*a* closes the water pipe 12 serving as the heat medium pipe.

Next, the flow of the operation of the heat pump device formed as above is described with reference to FIG. 7. First, in Step S1, when the pump 9 is operating, the water pressure sensor 16 detects the internal pressure of the water pipe 12 of the water circuit, and the refrigerant pressure sensor 17 detects the internal pressure of the refrigerant pipe 3 of the refrigerant circuit.

Next, in Step S2, the control device 20 checks whether the internal pressure of the water pipe 12 (water circuit) detected by the water pressure sensor 16 has risen to a value that is equal to or more than the water pressure reference value. When the internal pressure of the water pipe 12 is not equal to or more than the water pressure reference value, the processing returns to Step S1. Meanwhile, when the internal pressure of the water pipe 12 is equal to or more than the water pressure reference value, the processing proceeds to Step S3.

In Step S3, the control device 20 checks whether the internal pressure of the refrigerant pipe 3 (refrigerant circuit) detected by the refrigerant pressure sensor 17 has dropped to a value that is equal to or less than the refrigerant pressure reference value. When the internal pressure of the refrigerant pipe 3 is not equal to or less than the refrigerant pressure reference value, the processing returns to Step S1. Meanwhile, when the internal pressure of the refrigerant pipe 3 is equal to or less than the refrigerant pressure reference value, the processing proceeds to Step S4.

In Step S4, the control device 20 closes the first shut-off valve 15*a*. When Step S4 finishes, the sequence of the operation flow ends.

Other configurations and operations are similar to those in Embodiment 2, and detailed descriptions thereof are omitted.

In the heat pump device formed as above, when the pump 9 is operating, the water pressure sensor 16 detects the internal pressure of the water pipe 12, and the refrigerant pressure sensor 17 detects the internal pressure of the refrigerant pipe 3. When the outside air temperature rises or when the air conditioning apparatus performs the heating operation, the water temperature in the water circuit rises, the inside of the water circuit expands, and the pressure in the water circuit rises. At this time, the refrigerant in the refrigerant circuit close to the water heat exchanger 10 becomes high in temperature, and hence expands. As a result, the pressure in the refrigerant circuit also rises. Therefore, in that case, the first shut-off valve 15*a* does not close.

When the outside air temperature decreases or when the air conditioning apparatus performs the cooling operation, the water temperature in the water circuit decreases, the inside of the water circuit contracts, and the pressure in the water circuit decreases. At this time, the refrigerant in the refrigerant circuit close to the water heat exchanger 10 also becomes low in temperature, and hence contracts. As a result, the pressure in the refrigerant circuit also decreases. Therefore, the first shut-off valve 15*a* does not close also in that case.

With respect to the above, when the refrigerant enters the water pipe 12 of the water circuit in the water heat exchanger 10 due to damage of the water heat exchanger 10, the refrigerant flows out, thereby reducing the internal pressure of the refrigerant pipe 3. Meanwhile, because the refrigerant flowing out of the refrigerant circuit enters the water pipe 12, the internal pressure of the water pipe 12 rises. When the refrigerant continues to flow out from the refrigerant circuit and enter the water circuit, the internal pressure of the refrigerant pipe 3 becomes equal to or less than the refrigerant pressure reference value, and the internal pressure of the water pipe 12 becomes equal to or more than the water pressure reference value, the control device 20 closes the water pipe 12 by the first shut-off valve 15*a*.

When the water pipe 12 is closed by the first shut-off valve 15*a*, as described in Embodiment 2, the refrigerant that has entered the water pipe 12 can be prevented from reaching the indoor-side air vent valve 14, and the refrigerant that has entered the water pipe 12 can be discharged from the outdoor-side air vent valve 11. Therefore, according to the heat pump device according to Embodiment 4, even when the pump 9 is operating, when the refrigerant enters the water pipe 12 of the water circuit in the water heat exchanger 10 due to damage of the water heat exchanger 10, the refrigerant can be prevented from being discharged into the body of the indoor unit 2 from the indoor-side air vent valve 14, and the refrigerant can be discharged from the outdoor-side air vent valve 11 more reliably.

The control device 20 may stop the operation of the pump 9 when the first shut-off valve 15*a* is closed.

The heat pump device according to Embodiment 4 can be similarly formed also in the configuration illustrated FIG. 4 in Embodiment 2 as a modified example. That is, when both of the first shut-off valve 15*a* and the second shut-off valve 15*b* are included, both of the first shut-off valve 15*a* and the second shut-off valve 15*b* only need to be closed when the internal pressure of the refrigerant, pipe 3 becomes equal to or less than the refrigerant pressure reference value, and the internal pressure of the water pipe 12 becomes equal to or more than the water pressure reference value.

INDUSTRIAL APPLICABILITY

The present invention can be used in a heat pump device applied to an air conditioning apparatus including a room air conditioner and an industrial packaged air conditioner, a water heater, a display case, a refrigerator, and a chiller system, for example, the heat pump device including a primary circuit (refrigerant circuit) in which a refrigerant circulates and a secondary circuit (heat medium circuit) in which a heat medium circulates.

REFERENCE SIGNS LIST

1 Outdoor unit
2 Indoor unit
3 Refrigerant pipe
4 Compressor
5 Four-way valve
6 Outdoor heat exchanger
7 Outdoor fan
8 Expansion valve
9 Pump
10 Water heat exchanger
11 Outdoor-side air vent valve
12 Water pipe
13 Indoor heat exchanger
14 Indoor-side air vent valve
15*a* First shut-off valve
15*b* Second shut-off valve
16 Water pressure sensor
17 Refrigerant pressure sensor
18 Indoor fan
19 Branch pipe
20 Control device

The invention claimed is:

1. A heat pump device comprising:

a compressor configured to compress refrigerant;

a decompressor configured to decompress the refrigerant;

an air heat exchanger configured to exchange heat between the refrigerant and air;

a liquid heat exchanger configured to exchange heat between the refrigerant and liquid heat medium;

a refrigerant pipe connecting the compressor, the decompressor, the air heat exchanger and the liquid heat exchanger circularly, wherein the refrigerant pipe is filled with the refrigerant;

a pump configured to cause the liquid heat medium to flow in the liquid heat exchanger;

a heat medium pipe connecting the liquid heat exchanger and the pump circularly, wherein the heat medium pipe is filled with the liquid heat medium;

a first air vent valve and a second air vent valve which are able to discharge gas in the heat medium pipe outside, wherein the first air vent valve and the second air vent valve are self-control valves;

a first body housing the compressor, the decompressor, the air heat exchanger, the liquid heat exchanger, the refrigerant pipe and the first air vent valve, and a second body arranged outside of the first body, wherein the second body houses the second air vent valve, and wherein the pump is configured to cause the liquid heat medium to flow in a predetermined circulatory direction in the heat medium pipe, the liquid heat exchanger, the first air vent valve and the second air vent valve arranged in this order along the circulatory direction, an air passage is formed in the first body, and the air passage is configured to discharge air, taken from the outside of the first body, to the outside of the first body after exchanging heat of the air in the air heat exchanger; and the first air vent valve is arranged on a windward side of the air heat exchanger in the air passage.

2. The heat pump device according to claim 1, wherein the pump is housed in the first body.

3. The heat pump device according to claim 1, wherein the first air vent valve and the second air vent valve are pressure regulating valves capable of keeping an internal pressure of the heat medium pipe constant by opening the heat medium pipe when the internal pressure of the heat medium pipe becomes equal to or more than a preset value.

4. The heat pump device according to claim 1, further comprising a first shut-off valve capable of closing the heat medium pipe, wherein the first shut-off valve, the liquid heat exchanger, the first air vent valve, and the second air vent valve are arranged in this order along the circulatory direction.

5. The heat pump device according to claim 4, wherein the first shut-off valve closes the heat medium pipe when the pump is stopped.

6. The heat pump device according to claim 4, further comprising:

a refrigerant pressure sensor configured to detect an internal pressure of the refrigerant pipe; and a heat medium pressure sensor configured to detect an internal pressure of the heat medium pipe, wherein the first shut-off valve closes the heat medium pipe when the internal pressure of the refrigerant pipe is equal to or less than a preset refrigerant pressure reference value and the internal pressure of the heat medium pipe is equal to or more than a preset heat medium pressure reference value.

7. The heat pump device according to claim 4, further comprising a second shut-off valve capable of closing the heat medium pipe, wherein the first shut-off valve, the liquid heat exchanger, the first air vent valve, the second shut-off valve, and the second air vent valve are arranged in this order along the circulatory direction.

8. The heat pump device according to claim 7, wherein the second shut-off valve closes the heat medium pipe when the pump is stopped.

9. The heat pump device according to claim 7, wherein the first shut-off valve and the second shut-off valve are housed in the first body.

10. The heat pump device according to claim 4, wherein:

the heat medium pipe further includes a branch pipe housed in the second body, connected to the heat medium pipe, and extending vertically upward;

the second air vent valve is arranged on an uppermost end portion of the branch pipe; and the first shut-off valve is arranged in the middle of the branch pipe.

11. The heat pump device according to claim 1, wherein the refrigerant is flammable.

12. A heat pump device comprising:

a compressor configured to compress refrigerant;

a decompressor configured to decompress the refrigerant;

an air heat exchanger configured to exchange heat between the refrigerant and air;

a liquid heat exchanger configured to exchange heat between the refrigerant and liquid heat medium;

a refrigerant pipe connecting the compressor, the decompressor, the air heat exchanger and the liquid heat exchanger circularly, wherein the refrigerant pipe is filled with the refrigerant;

a pump configured to cause the liquid heat medium to flow in the liquid heat exchanger;

a heat medium pipe connecting the liquid heat exchanger and the pump circularly, wherein the heat medium pipe is filled with the liquid heat medium;

a first air vent valve and a second air vent valve which are able to discharge gas in the heat medium pipe outside, wherein the first air vent valve and the second air vent valve are self-control valves;

a first body housing the compressor, the decompressor, the air heat exchanger, the liquid heat exchanger, the refrigerant pipe and the first air vent valve;

a second body arranged outside of the first body, wherein the second body houses the second air vent valve;

a first shut-off valve capable of closing the heat medium pipe;

a refrigerant pressure sensor configured to detect an internal pressure of the refrigerant pipe, and a heat medium pressure sensor configured to detect an internal pressure of the heat medium pipe, wherein the pump is configured to cause the liquid heat medium to flow in a predetermined circulatory direction in the heat medium pipe, the first shut-off valve, the liquid heat exchanger, the first air vent valve, and the second air vent valve arranged in this order along the circulatory direction, and the first shut-off valve closes the heat medium pipe when the internal pressure of the refrigerant pipe is equal to or less than a preset refrigerant pressure reference value and the internal pressure of the heat medium pipe is equal to or more than a preset heat medium pressure reference value.

13. A heat pump device comprising:

a compressor configured to compress refrigerant;

a decompressor configured to decompress the refrigerant;

an air heat exchanger configured to exchange heat between the refrigerant and air;

a liquid heat exchanger configured to exchange heat between the refrigerant and liquid heat medium;

a refrigerant pipe connecting the compressor, the decompressor, the air heat exchanger and the liquid heat exchanger circularly, wherein the refrigerant pipe is filled with the refrigerant;

a pump configured to cause the liquid heat medium to flow in the liquid heat exchanger;

a heat medium pipe connecting the liquid heat exchanger and the pump circularly, wherein the heat medium pipe is filled with the liquid heat medium;

a first air vent valve and a second air vent valve which are able to discharge gas in the heat medium pipe outside, wherein the first air vent valve and the second air vent valve are self-control valves;

a first body housing the compressor, the decompressor, the air heat exchanger, the liquid heat exchanger, the refrigerant pipe and the first air vent valve;

a second body arranged outside of the first body, wherein the second body houses the second air vent valve, and a first shut-off valve capable of closing the heat medium pipe, wherein the pump is configured to cause the liquid heat medium to flow in a predetermined circulatory direction in the heat medium pipe, the first shut-off valve, the liquid heat exchanger, the first air vent valve, and the second air vent valve arranged in this order along the circulatory direction, the heat medium pipe further includes a branch pipe housed in the second body, connected to the heat medium pipe, and extending vertically upward;

the second air vent valve is arranged on an uppermost end portion of the branch pipe, and the first shut-off valve is arranged in the middle of the branch pipe.

* * * * *